(12) United States Patent
Batchelor et al.

(10) Patent No.: US 12,352,580 B2
(45) Date of Patent: Jul. 8, 2025

(54) METHOD AND APPARATUS FOR DETERMINING A POSITION OF A VEHICLE

(71) Applicant: HITACHI RAIL GTS UK LIMITED, London (GB)

(72) Inventors: Andrew Batchelor, Reading (GB); Douglas Watson, Reading (GB)

(73) Assignee: HITACHI RAIL GTS UK LIMITED, London (GB)

(*) Notice: Subject to any disclaimer, the term of this patent is extended or adjusted under 35 U.S.C. 154(b) by 982 days.

(21) Appl. No.: 17/297,001

(22) PCT Filed: Nov. 28, 2019

(86) PCT No.: PCT/EP2019/082918
§ 371 (c)(1),
(2) Date: May 26, 2021

(87) PCT Pub. No.: WO2020/109471
PCT Pub. Date: Jun. 4, 2020

(65) Prior Publication Data
US 2022/0024504 A1    Jan. 27, 2022

(30) Foreign Application Priority Data
Nov. 30, 2018 (GB) ...................................... 1819620

(51) Int. Cl.
*G01C 21/30* (2006.01)
*B61L 25/02* (2006.01)
(Continued)

(52) U.S. Cl.
CPC ............ *G01C 21/30* (2013.01); *B61L 25/021* (2013.01); *B61L 25/025* (2013.01); *B61L 25/026* (2013.01);
(Continued)

(58) Field of Classification Search
CPC .... B61L 25/025; B61L 25/021; B61L 25/026; B61L 25/023; B61L 2205/00;
(Continued)

(56) References Cited

U.S. PATENT DOCUMENTS

2001/0020216 A1 * 9/2001 Lin ........................ G01S 19/44
701/472
2003/0216865 A1   11/2003 Riewe et al.
(Continued)

FOREIGN PATENT DOCUMENTS

EP      3339807 A1 * 6/2018 ............. G01C 21/30
EP      3358079 A1 * 8/2018 ............. A01D 90/10

OTHER PUBLICATIONS

PCT International Preliminary Report on Patentability for corresponding PCT Application No. PCT/EP2019/082918, issued on May 25, 2021—9 pages.
(Continued)

Primary Examiner — Zachary L Kuhfuss
(74) Attorney, Agent, or Firm — Dority & Manning, P.A.

(57) ABSTRACT

A computer-implemented method of determining a position of a vehicle within a transport network comprises obtaining track geometry data indicating track geometry of at least a part of the transport network; receiving first sensor data from an inertial measurement unit mounted to the vehicle; executing a Bayesian estimation filter algorithm to predict a position of the vehicle, wherein the Bayesian estimation filter algorithm comprises a process model, the process model comprising a strapdown inertial navigation algorithm, and wherein the strapdown inertial navigation algorithm generates data indicative of the predicted position of the vehicle based at least upon the first sensor data and the track geometry data such that the predicted position of the vehicle lies on a track defined by the track geometry data; receiving second sensor data from a sensor other than an inertial
(Continued)

measurement unit, wherein the sensor is mounted to the vehicle; executing the Bayesian estimation filter algorithm to update the predicted position of the vehicle based at least upon the second sensor data; and generating an output indicative of a position of the vehicle within the transport network based upon at least one of the predicted position of the vehicle and the updated predicted position of the vehicle.

22 Claims, 6 Drawing Sheets (51) Int. Cl.
*G01C 21/00* (2006.01)
*G01C 21/16* (2006.01)
*G01S 19/49* (2010.01)

(52) U.S. Cl.
CPC ....... *G01C 21/005* (2013.01); *G01C 21/1652* (2020.08); *G01C 21/1656* (2020.08); *G01S 19/49* (2013.01); *B61L 25/023* (2013.01); *B61L 2205/00* (2013.01)

(58) Field of Classification Search
CPC .............. G01C 21/005; G01C 21/1652; G01C 21/1656; G01C 21/30; G01S 19/49
See application file for complete search history.

(56) References Cited

U.S. PATENT DOCUMENTS

| | | | |
|---|---|---|---|
| 2004/0140405 | A1 | 7/2004 | Meyer |
| 2016/0069690 | A1* | 3/2016 | Li ........................ G01C 21/206 701/411 |
| 2018/0164124 | A1* | 6/2018 | Viswanathan ......... B64D 47/08 |
| 2022/0024504 | A1* | 1/2022 | Batchelor ............ G01C 21/005 |

OTHER PUBLICATIONS

GB Combined Search and Examination Report for Corresponding Application No. GB1819620.4, Jun. 7, 2019—6 pages.
PCT International Search Report and Written Opinion for corresponding PCT Application No. PCT/EP2019/082918, mailed on Apr. 21, 2020, 13 pages.
Heirich et al., "Bayesian train localization method extended by 3D geometric railway track observations from inertial sensors," 15th International Conference on Information Fusion, Jul. 9, 2012, pp. 416-423.
Böhringer, "Gleisselektive Ortung von Schienenfahrzeugen mit bordautonomer Sensorik" (Track-selective tracking of rail vehicles with on-board autonomous sensors), PHD thesis, Jan. 10, 2008—178 pages.
Van Der Merwe et al., Sigma-point Kalman filters for nonlinear estimation and sensor-fusion: Applications to integrated navigation, AIAA Guidance, Navigation, and Control Conference and Exhibit, Providence, Rhode Island, Aug. 16-19, 2004—30 pages.
Van Der Merwe et al., Sigma-point Kalman filters for probabilistic inference in dynamic state-space models, proceedings of the Workshop on Advances in Machine Learning, Montreal, Canada, Jun. 8-11, 2003—397 pages.
Hall, "Lie Groups, Lie Algebras, and Representations: An Elementary Introduction," Graduate Texts in Mathematics 222 ($2^{nd}$ ed.), Springer, 2015, Abstract Only—3 pages.
Iwasawa, On the representation of Lie algebras, Jap. J. Math. 19, (1948), pp. 405-426, Abstract Only—1 page.
Hertzberg et al., "Integrating Generic Sensor Fusion Algorithms with Sound State Representations through Encapsulation of Manifolds," Information Fusion, vol. 14, Issue 1, Jan. 2013, pp. 57-77—31 pages.
Fletcher et al., "Statistics of Shape via Principal Component Analysis on Lie Groups," Proceedings of IEEE Computer Society Conference on Computer Vision and Pattern Recognition, 2003, pp. 95-101—7 pages.

* cited by examiner

METHOD AND APPARATUS FOR DETERMINING A POSITION OF A VEHICLE

This application is a national phase application of International Application No. PCT/EP2019/082918 filed on Nov. 28, 2019, which, in turn, is based upon and claims the right of priority to UK Patent Application No. 1819620.4 filed on Nov. 30, 2018, the disclosures of both of which are hereby incorporated by reference herein in their entirety for all purposes.

TECHNICAL FIELD

The present application relates to a method and an apparatus for determining a position of a vehicle within a transport network. More specifically but not exclusively, the present application relates to a method and an apparatus for accurately determining a position of a vehicle within a transport network using a Bayesian estimation filter algorithm, which fuses sensor data from an inertial measurement unit (IMU) and a non-IMU sensor attached to the vehicle while taking into account the track constraints imposed by the transport network to the vehicle so that the position of the vehicle estimated by Bayesian estimation filter algorithm always lies on the tracks of the transport network.

BACKGROUND

Accurate positioning of vehicles within a transport network relies upon sources of absolute position, e.g. Global Navigation Satellite Systems (GNSS) sensors or fixed trackside infrastructure (e.g., balises). The GNSS sensors suffer from a lack of signal availability in many common operational environments, e.g. tunnels. The fixed infrastructure is expensive to install and maintain, and therefore provides limited measurement availability due to costs.

Thus, there is a need to provide a low-cost positioning solution that provides good positioning accuracy and can operate autonomously for extended periods of time without sources of absolute position in a wide range of environments.

SUMMARY

According to a first aspect described herein, there is provided a computer-implemented method of determining a position of a vehicle within a transport network, comprising: obtaining track geometry data indicating track geometry of at least a part of the transport network; receiving first sensor data from an inertial measurement unit mounted to the vehicle; executing a Bayesian estimation filter algorithm to predict a position of the vehicle, wherein the Bayesian estimation filter algorithm comprises a process model, the process model comprising a strapdown inertial navigation algorithm, and wherein the strapdown inertial navigation algorithm generates data indicative of the predicted position of the vehicle based at least upon the first sensor data and the track geometry data such that the predicted position of the vehicle lies on a track defined by the track geometry data; receiving second sensor data from a sensor other than an inertial measurement unit, wherein the sensor is mounted to the vehicle; executing the Bayesian estimation filter algorithm to update the predicted position of the vehicle based at least upon the second sensor data; and generating an output indicative of a position of the vehicle within the transport network based upon at least one of the predicted position of the vehicle and the updated predicted position of the vehicle.

The transport network may be a guided transport network (e.g., railway, tramway). The guided transport network has tracks to which movement of the vehicle (e.g., a train, a tram) is strictly confined in normal operations.

The transport network may also be a road or motorway network having tracks (e.g., roads or routes) for a vehicle (e.g., car, lorry) to follow, or a waterway network defining tracks (e.g., a canal wherein the tracks are defined by the walls of the canal) constraining a route taken by a vehicle (e.g., a boat).

In general, the transport network imposes track constraints on the position and the movement of the vehicle. For example, the vehicle is expected to move along the curvature of the tracks/routes provided by the transport network, unless something goes seriously wrong. The track geometry data, as its name suggests, is data indicative of the track geometry of the transport network, and thus defines the track constraints imposed by the transport network to the vehicle.

The Bayesian estimation filter algorithm is commonly used to estimate a state of a system based upon sensor measurements which indirectly measure the state. The Bayesian estimation filter algorithm recursively predicts the state in a prediction step and updates the predicted state based upon measurement data in an update step. The position of the vehicle is a part of the state estimated by the Bayesian estimation filter algorithm. The term "Bayesian estimation filter algorithm" may be used interchangeably herein with the terms "sensor fusion algorithm" or "optimal estimation algorithm".

It will be appreciated that the strapdown inertial navigation algorithm is executed during the prediction step and calculates by dead reckoning the kinematic state (e.g., the position, attitude or velocity) of the vehicle to which the inertial measurement unit is mounted. It will further be understood that the Bayesian estimation filter algorithm (in particular, the strapdown inertial navigation algorithm) may require an initial condition of the vehicle in order to predict the position of the vehicle during the prediction step. The initial condition may comprise an initial position of the vehicle, e.g., an initial position of the vehicle along a track defined by the track geometry data. The initial condition may be provided by a sensor mounted to the vehicle which provides information indicating absolute positions of the vehicle, or may be provided by the updated predicted position of the vehicle generated during the latest update step.

Advantageously, the strapdown inertial navigation algorithm generates data indicative of the predicted position of the vehicle by taking into account the first sensor data and the track geometry data during the prediction step, such that the predicted position of the vehicle lies on a track defined by the track geometry data. In other words, the strapdown inertial navigation algorithm is constrained by the track geometry data (i.e., the constraints imposed by the transport network to the vehicle).

By constraining the strapdown inertial navigation algorithm by the track geometry data, the problem of estimating an unconstrained three-dimensional position of the vehicle is advantageously reduced to the problem of estimating a one-dimensional position of the vehicle along the track of the transport network, because the vehicle has only one degree of freedom along the track. Further, the constrained strapdown inertial navigation algorithm can be used to model the propagation of kinematic state estimation errors into the one-dimensional position solution space. Consequently, the utilisation of the track geometry data in the strapdown inertial navigation algorithm is useful for improving the accuracy of the determined position of the vehicle and can reduce significantly errors accumulated by the Bayesian estimation filter algorithm, especially when the Bayesian estimation filter algorithm relies upon the low cost inertial measurement unit and other low-cost sensors and operates without absolute positional information for extended periods of time.

With the constrained strapdown inertial navigation algorithm, the computer-implemented method may achieve an improved accuracy in positioning a vehicle and exploits low-cost sensors without heavily relying upon GNSS sensors or track-side infrastructure (e.g., balises). As such, the computer-implemented method is suitable for use in environments such as metros and urban environments where GNSS signals may not be available at all times and there is a reduced or removed need for the provision of track-side infrastructure which is costly to install and maintain.

The inertial measurement unit may be a low-cost MEMS inertial measurement unit.

The computer-implemented method may further comprise executing the strapdown inertial navigation algorithm to calculate a speed of the inertial measurement unit along a track defined by the track geometry data based at least upon the first sensor data, to integrate the speed over time and to generate data indicative of the predicted position of the vehicle based at least upon the track geometry data and the integration of the speed.

In this way, the use of the track geometry data in the strapdown inertial navigation algorithm models the propagation of kinematic state estimation errors into the one-dimensional position solution space and allows the instantaneous curvature and tangent information of the track as defined in the track geometry data to be taken into account. Consequently, the accuracy of the determined position of the vehicle may be improved.

The computer-implemented method may further comprise dynamically obtaining the track geometry data indicating track geometry of at least a part of the transport network which is in the vicinity of the predicted position of the vehicle and/or the updated predicted position of the vehicle.

The term "dynamically" means that the track geometry data is updated or constructed on-the-fly based upon the estimated position of the vehicle output by the Bayesian estimation filter algorithm. In this way, the track geometry data focuses upon the local constraints imposed to the vehicle by a small part of the transport network (instead of the entire transport network) in the vicinity of the vehicle. Therefore, the track geometry data can be computed with great flexibility and efficiency.

Obtaining the track geometry data may comprise: accessing a map database, wherein the map database comprises sample points positioned along tracks within the transport network; retrieving from the map database sample points in the vicinity of the predicted position of the vehicle and/or the updated predicted position of the vehicle; and applying an interpolation function through the retrieved sample points to obtain a track constraint function, wherein the track geometry data comprises the track constraint function.

Advantageously, by applying an interpolation function through the retrieved sample points from the map database, the track constraint function (which is included within the track geometry data) comprises lines/curves which represent centrelines of the tracks within the transport network. Thus, the track constraint function is able to represent the potential route(s) of the vehicle, the potential direction of the vehicle, and kinematic constraints to be imposed within the Bayesian estimation filter algorithm to improve the estimation of errors in the kinematic state (e.g., the position) of the vehicle when no source of absolute position information is available. It would be appreciated that the density of the sample points (which may be used interchangeably with "support points") affects the accuracy of the track constraint function.

The track constraint function may comprise a twice differentiable curve with a continuous second-order derivative at least one of the retrieved sample points.

Advantageously, the twice differentiable curve with a continuous second-order derivative allows the curvature and tangent information of the tracks (in particular, the track centrelines) within the transport network to be modelled more accurately than would be possible with a conventional piecewise linear interpolation using the same number of sample points. Accordingly, the track constraint function provides a powerful constraint on the to-be-estimated kinematic state of the vehicle without discontinuities, and improves the estimation of errors in the output of the Bayesian estimation filter algorithm.

The interpolation function may comprise a cubic spline function.

Advantageously, the cubic spline interpolation implicitly provides a twice differentiable curve with a continuous second-order derivative. Furthermore, amongst all of the twice differentiable functions, the cubic spline interpolation function yields the smallest norm of strain energy and allows the track constraint function obtained thereby to have a curve progression with minimal oscillations between the sample points.

The track constraint function may be parameterised by an arc-length of the track.

The sensor other than an inertial measurement unit may be selected from a group consisting of at least one of a GNSS sensor, a balise reader, a radar, a speed sensor, an odometer, a video camera and a lidar detector.

The track geometry data may be parameterised by an arc-length of the track.

Advantageously, parameterising the track constraint function and/or the track geometry data by the arc-length instead of the conventional spline segment chord length offers a more natural representation of the track centrelines and is more convenient in imposing track constraints to the Bayesian estimation filter algorithm (in particular, the strapdown inertial navigation algorithm) for estimating the position of the vehicle.

The computer-implemented method may further comprise executing the strapdown inertial navigation algorithm to calculate a first-order derivative of an arc-length of the track travelled by a reference frame, based upon the first sensor data, an earth's angular rate and an earth's gravitation; wherein the reference frame is arranged to be attached to a fixed point-of-reference on the vehicle and arranged to be constrained to move along the track defined by the track geometry data.

The reference frame may have an axis which is parallel to a centreline of the track defined by the track geometry data. In this way, the reference frame is constrained to move along the track defined by the track geometry data. The reference frame may be arranged to be attached to a fixed point-of-reference on a bogie of the vehicle. The first-order derivative of the arc-length travelled by the reference frame may be equal to the speed of the reference frame along the track defined by the track geometry data.

The computer-implemented method may further comprise executing the strapdown inertial navigation algorithm to integrate the first-order derivative over time so as to obtain the arc-length travelled by the reference frame.

The computer-implemented method may further comprise executing the strapdown inertial navigation algorithm to generate data indicative of the predicted position of vehicle based at least upon the track geometry data and the arc-length travelled by the reference frame.

The first sensor data may comprise a specific force and an angular rate measured by the inertial measurement unit.

The computer-implemented method may further comprise determining whether the second sensor data is available, and in response to determining that the second sensor data is not available: obtaining new track geometry data indicating track geometry of at least a part of the transport network based upon the predicted positon of the vehicle; and executing the Bayesian estimation filter algorithm to predict a position of the vehicle based at least upon the new track geometry data and the first sensor data received from the inertial measurement unit.

That is, the update phase of the Bayesian estimation filter algorithm is triggered by the second sensor data, and the Bayesian estimation filter algorithm repeats the prediction steps if the second sensor data is not available. In this way, the first sensor data and the second sensor data can be asynchronously provided to the Bayesian estimation filter algorithm.

The computer-implemented method may further comprise executing the Bayesian estimation filter algorithm to update the predicted position of the vehicle based at least upon the second sensor data and the track geometry data.

By further imposing the track constraint defined by the track geometry data in the update step, the predicted position of the vehicle is adjusted or updated along the track of the transport network as defined by the track geometry data. Advantageously, the Bayesian estimation filter algorithm would not produce an off-track updated position, and the accuracy of the Bayesian estimation filter algorithm is therefore improved.

The computer-implemented method may further comprise calculating a pseudo-measurement of the attitude of the vehicle based upon the track geometry data and the predicted position of the vehicle; and executing the Bayesian estimation filter algorithm to update the predicted position of the vehicle based upon the pseudo-measurement of the attitude of the vehicle.

That is, the track geometry data provides a pseudo-measurement, which is used together with the second sensor data for updating the predicted position of the vehicle.

The pseudo-measurement of the attitude of the vehicle may be calculated based upon a tangent of the track geometry data at the predicted position of the vehicle.

The Bayesian estimation filter algorithm may comprise an unscented Kalman filter.

The unscented Kalman filter is advantageous in that it is better at handling non-linearities and it does not require the evaluation of explicit, or numerically approximated, Jacobians for the process models.

The Bayesian estimation filter algorithm may comprise a Lie-group unscented Kalman filter.

That is, the Bayesian estimation filter algorithm may operate in a state space and/or a measurement space which is represented by Lie groups (in particular, matrix Lie groups).

The strapdown inertial navigation algorithm may comprise a Lie group strapdown inertial navigation algorithm.

That is, the strapdown inertial navigation algorithm may operate in a state space represented by Lie groups (in particular, matrix Lie groups). It is advantageous to represent the state and the measurement spaces using Lie groups, because Lie groups can easily represent a complex state which comprises multiple sub-states using a product matrix Lie group without losing the typological structure of the state space.

The vehicle may comprise one of a train or a tram.

According to a second aspect described herein, there is provided a computer program comprising computer readable instructions configured to cause a computer to carry out a method according to the first aspect described herein.

According to a third aspect described herein, there is provided a computer readable medium carrying a computer program according to the second aspect described herein.

According to a fourth aspect described herein, there is provided an apparatus for positioning a vehicle within a transport network, comprising: a memory storing processor readable instructions; and a processor arranged to read and execute the processor readable instructions stored in the memory, wherein the processor readable instructions comprise instructions arranged to control the processor to carry out a method according to the first aspect described herein.

The apparatus may be attached to the vehicle.

The apparatus may further comprise a map database comprising sample points positioned along tracks within at least a part of the transport network.

Where appropriate any of the optional features described above in relation to one of the aspects described herein may be applied to another one of the aspects described herein.

BRIEF DESCRIPTION OF THE DRAWINGS

Embodiments are now described, by way of example only, with reference to the accompanying drawings, in which.

In the figures, like parts are denoted by like reference numerals.

It will be appreciated that the drawings are for illustration purposes only and are not drawn to scale.

DETAILED DESCRIPTION OF THE PREFERRED EMBODIMENTS

Figure 1:
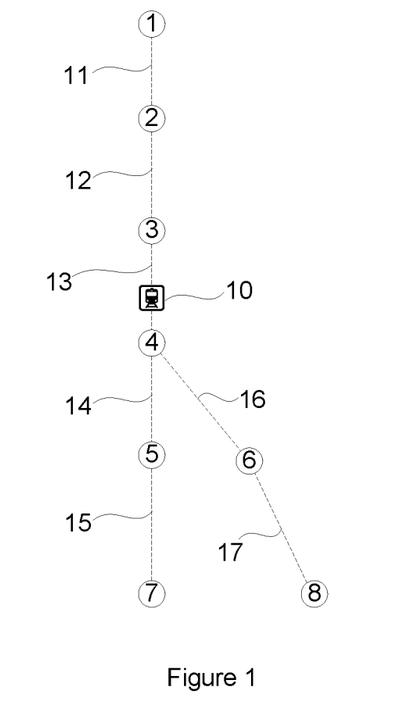
FIG. 1 schematically illustrates a part of a model of a transport network.

A model of a transport network is schematically shown in FIG. 1. The transport network may be a guided transport network (e.g., railway, tramway) which has tracks to which movement of the vehicle (e.g., a train, a tram) is strictly confined in normal operations. Alternatively, the transport network may be a road or motorway network, which has tracks (e.g., roads or routes) for a vehicle (e.g., a car, a lorry) to follow. Alternatively, the transport network may be a waterway having tracks (e.g. a canal) constraining a route taken by a vehicle (e.g., a boat). In the following exemplary embodiments, it is generally assumed that the transport network is a railway, though it is to be understood that the techniques described herein are not limited to such.

The transport network is represented by vertices 1-8 and edges 11-17. The vertices 1-8 are located along the tracks of the transport network. In an example, the positions of the vertices are known a priori. The vertices may be independent of the locations of fixed track-side infrastructure (e.g., balises) installed along the rail tracks. The vertices may also be referred to as support points in the following description. The edges 11-17 correspond to the tracks between the vertices 1-8. A sequence of the vertices connected via the edges 11-17 forms a path for a vehicle. The accuracy of a path is determined by the density of the vertices.

Figure 2:
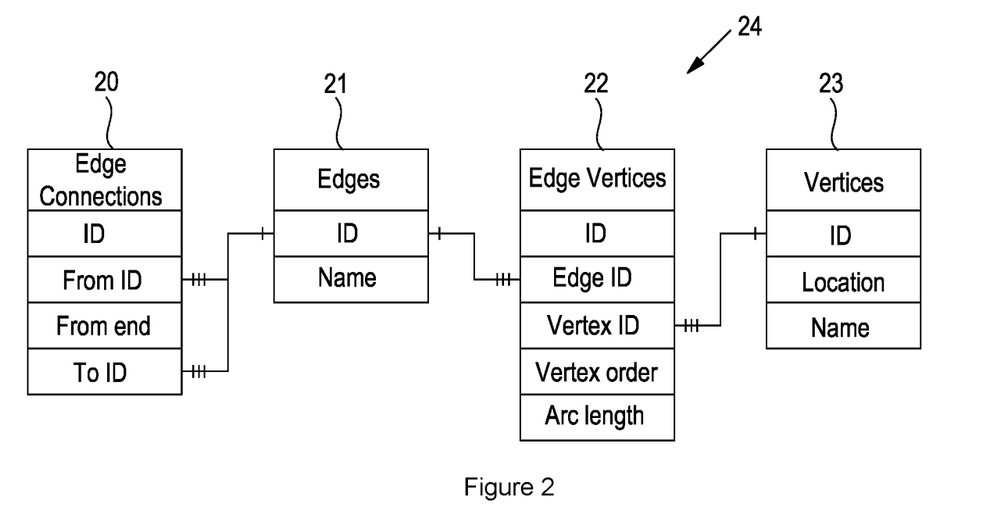
FIG. 2 schematically illustrates a map database storing the model of the transport network of FIG. 1.

In the presently described example, the model shown in FIG. 1 is stored digitally in a map database 24. The map database 24 may also be referred to as a support point database. FIG. 2 provides an example of the configuration of the map database 24.

In the example of FIG. 2, the map database 24 includes four types of data entities, i.e., Edge Connections 20, Edges 21, Edge Vertices 22 and Vertices 23. The connections in FIG. 2 are all one-to-many, with the single dash end representing the one end. Each of the data entities 20-23 has an "ID" attribute. The Edge Connections entity 20 further comprises a "From ID" attribute, a "From end" attribute and a "To ID" attribute. The Edges 21 entity further comprises a "Name" attribute. The Edge Vertices entity further comprises an "Edge ID" attribute, a "Vertex ID" attribute, a "Vertex order" attribute and an "Arc length" attribute. The Vertices entity 23 further comprises a "Location" attribute (storing location data such as, the Earth-Centred Earth-Fixed (ECEF) location of the respective vertex) and a "Name" attribute. The vertices 1-8 of FIG. 1 are represented by instances of the Vertices entity 23. An instance of the Edges entity 21 may include all of the vertices between junctions. For example, three instances of the Edges entity 21 may be provided for the transport network shown in FIG. 1, with the first instance including the vertices 1, 2, 3, 4, the second instance including the vertices 4, 5, 7 and with the third instance including the vertices 4, 6, 8. Generally, it will be understood that references below to Edge Connections 20, Edges 21, Edge Vertices 22 and Vertices 23 refer to instances of the corresponding entities.

Edge Vertices 22 associate the Edges 21 with the Vertices 23 which are located on or at the ends of each respective one of the Edges 21. In an example, the "Arc length" attribute of the Edge Vertices entity 22 indicates the arc length from the start (or the end) of an instance of the Edges 21 to a vertex included within that instance. In an alternative example, the parameter indicates the arc length from the start of an entire path (of which the instance of the Edges 21 is a part) to the vertex. The Arc length attribute provides the arc length of the tracks through the Vertices 23.

The Edge Connections 20 define the connections between the Edges 21. For example, an instance of Edge Connections entity 20 may define a "connected to" relationship between the first instance of the Edges entity 21 which includes the vertices 1, 2, 3, 4, and the second instance of the Edges entity 21 which includes the vertices 4, 5, 7 and the third instance of the Edges entity 21 which includes the vertices 4, 6, 8.

The map database 24 may be stored locally on a vehicle 10 (a representation of which is shown in the model of FIG. 1) which travels within the transport network, such that the vehicle can access the map database without requiring wireless communication channels. Alternatively, the map database 24 may be stored at a server (not shown) remote from the vehicle 10. It will be appreciated that the map database 24 may take any suitable configuration, and is not limited to the example provided by FIG. 2. In an example, the map database 24 is implemented using an SQL compliant database. It will be appreciated, however, that the map database 24 may be implemented in any way and need not be relational. For example, the database 24 may comprise flat files.

Figure 3:
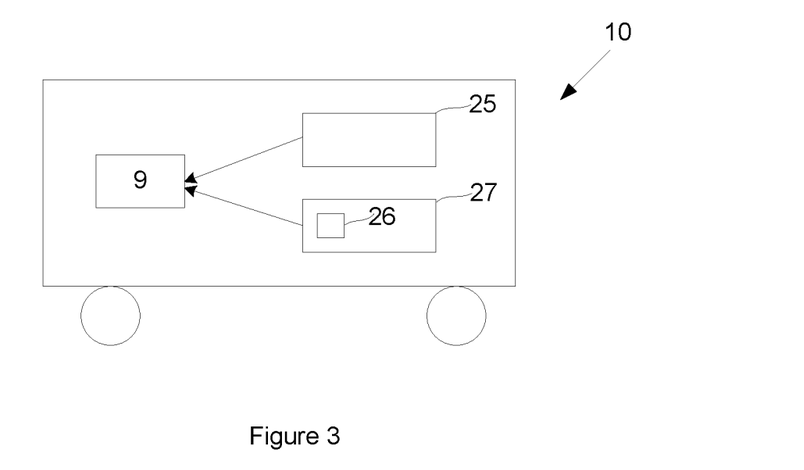
FIG. 3 schematically illustrates a vehicle which travels within the transport network of FIG. 1.

FIG. 3 schematically illustrates the vehicle 10. The vehicle 10 carries a controller 9 and a sensor group. The sensor group includes sensors for monitoring the motion of the vehicle 10. The sensor group includes at least one first sensor 25 which provides information indicating absolute positions of the vehicle, and at least one second sensor 27 which provides information indicating reference positions of the vehicle.

Examples of the first sensor 25 include a GNSS sensor, a balise reader, a video camera and a lidar detector. The first sensor 25 relies upon data transmission between the vehicle 10 and external sources (e.g., satellite, or balises installed along the tracks of the transport network or a database containing information for scene matching) to provide absolution positional information for the vehicle 10.

The second sensor 27 includes an IMU 26, and may include other sensors (e.g., a radar, a speed sensor, or an odometer). The IMU 26 may have a six degree-of-freedom (DOF) configuration and have one gyroscope and one accelerometer for each of three orthogonal axes. The accelerometer is for detecting the specific force, and the gyroscope is for detecting the angular rate. It would be appreciated that the IMU 26 may take a simpler configuration. The odometer may include a wheel-odometer, a visual-odometer, or a radar-odometer. In general, the odometer estimates the speed of the vehicle 10. The IMU 26 may be a low-cost Micro-Electro-Mechanical Systems (MEMS) IMU.

The second sensor 27 allows for dead reckoning navigation and does not rely upon signal transmission between the vehicle 10 and external sources. However, the second sensor 27 provides information that can be used to compute a relative position of the vehicle 10 given a set of initial conditions. Further, the second sensor 27 is subject to cumulative error and may undergo regular calibration procedures in order to maintain quality.

Figure 4:
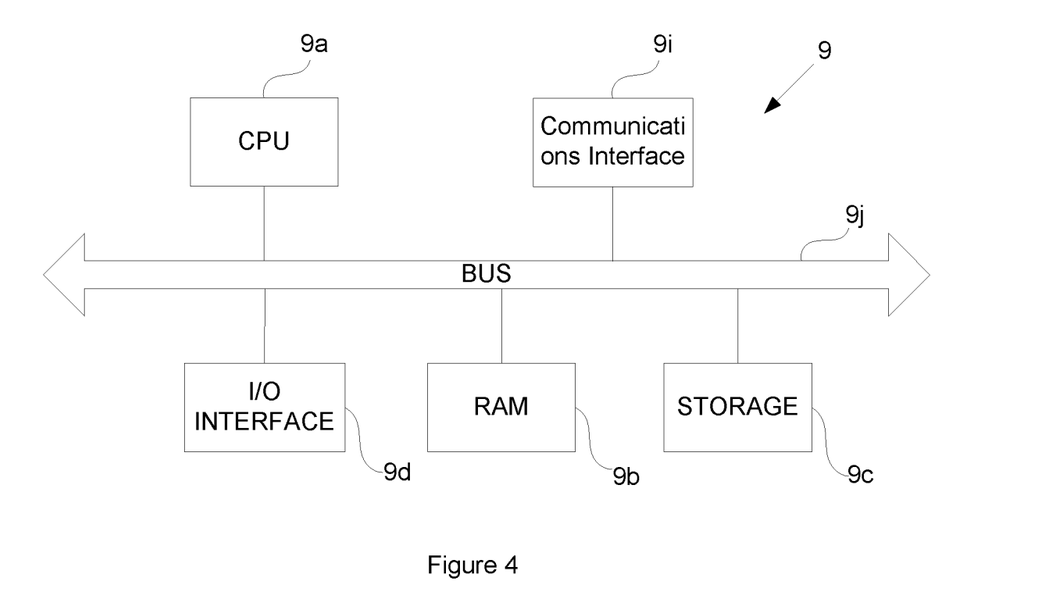
FIG. 4 schematically illustrates the structure of a controller carried by the vehicle of FIG. 3.

FIG. 4 schematically illustrates an exemplary structure of the controller 9. The controller 9 comprises a CPU 9a which is configured to read and execute instructions stored in a RAM memory 9b which may be a volatile memory. The RAM 9b stores instructions for execution by the CPU 9a and data used by those instructions. The controller 9 further comprises non-volatile storage 9c, such as, for example, a hard disk drive, although it will be appreciated that any other form of non-volatile storage may be used. Computer readable instructions for execution by the CPU 9a may be stored in the non-volatile storage 9c. Further, the non-volatile storage 9c may store a copy of the map database 24.

The controller 9 further comprises an I/O interface 9d to which peripheral devices used in connection with the controller 9 may be connected. The peripheral devices may include keyboard, data storage devices, etc. A communications interface 9i may also be provided. The communications interface 9i may provide for short range connections to other devices (e.g. the sensors 25, 27). The short range connections may be via Bluetooth®, near-field communication (NFC), etc. The communications interface 9*i* may also provide for connection to networks such as the Internet or satellites, for longer range communication. The longer range communication may be used to retrieve the map database 24 if the map database 24 is stored in a server remote from the vehicle 10. The longer range communication may also be used by a GNSS sensor to generate absolute positional information. The CPU 9*a*, RAM 9*b*, non-volatile storage 9*c*, I/O interface 9*d* and communications interface 9*i* are connected together by a bus 9*j*.

It will be appreciated that the arrangement of components illustrated in FIG. 4 is merely exemplary, and that the controller 9 may comprise different, additional or fewer components than those illustrated in FIG. 4.

Figure 5:
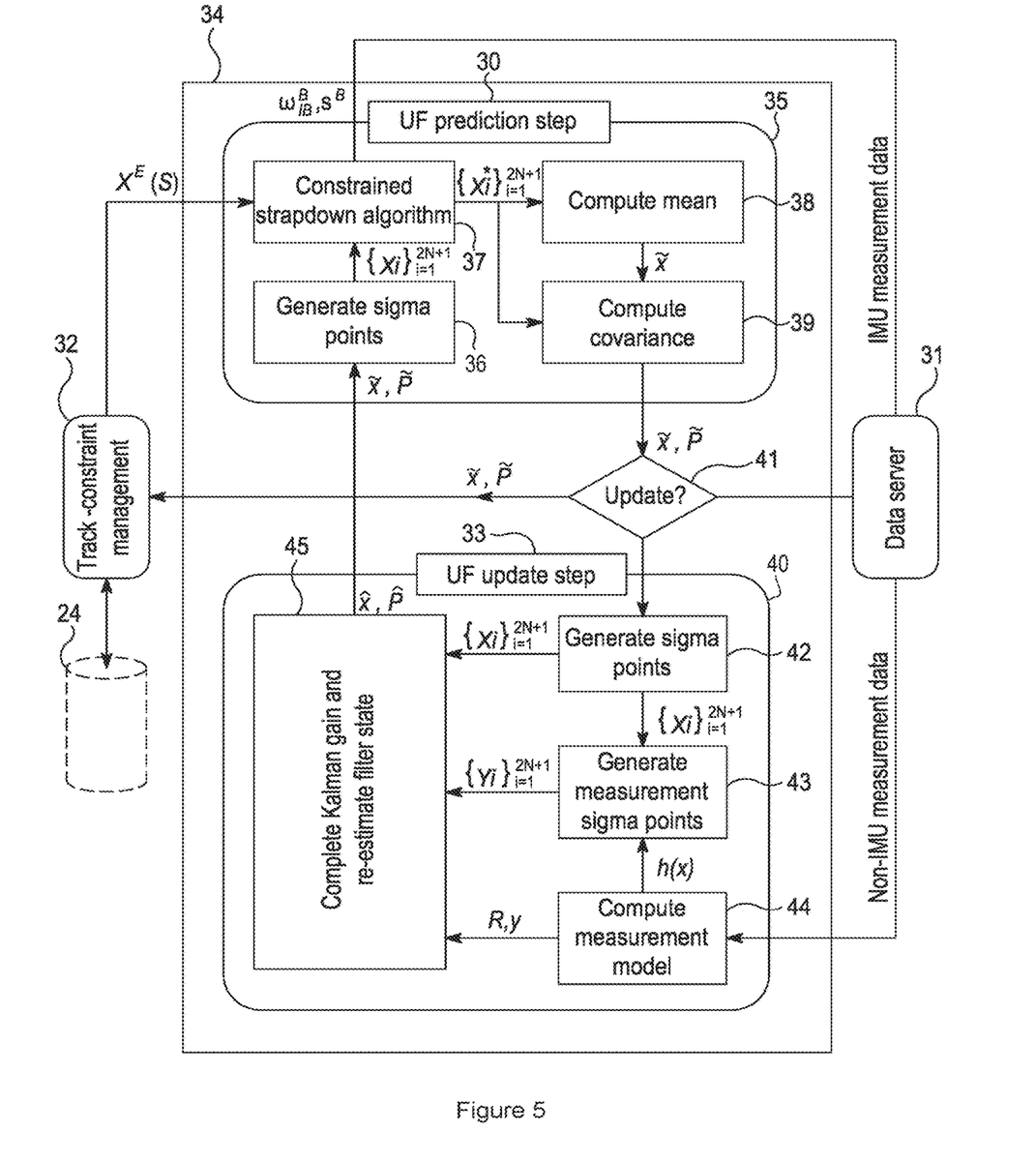
FIG. 5 schematically illustrates an example of a Bayesian estimation filter executed by the controller of FIG. 4 for estimating a position of the vehicle.
Figure 6:
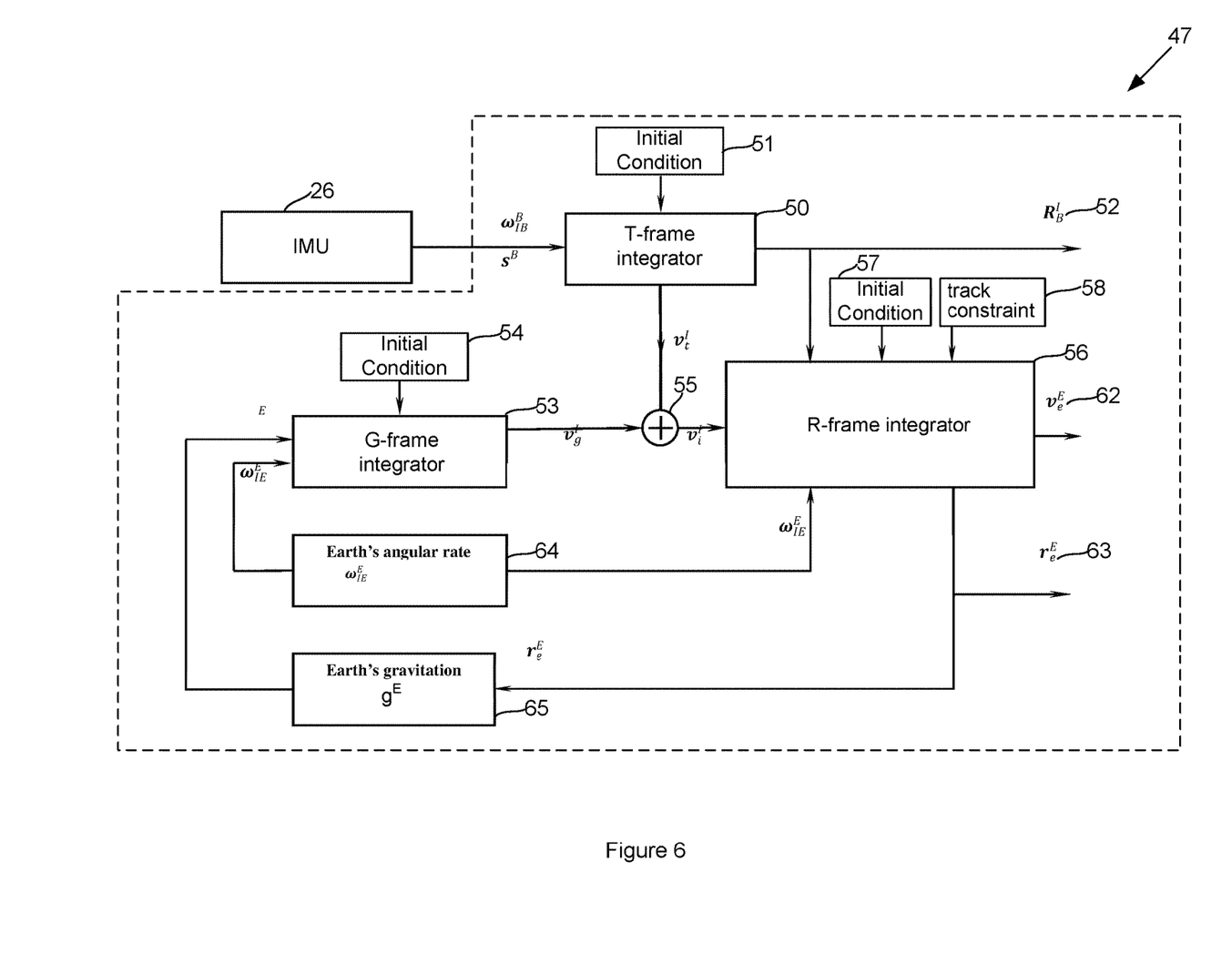
FIG. 6 schematically illustrates functional components of a constrained strapdown inertial navigation system used in the Bayesian estimation filter of FIG. 5.

The computer readable instructions stored in the non-volatile storage 9*c* provide functional components as shown in FIGS. 5 to 6. The computer readable instructions when executed by the CPU 9*a*, causes the controller 9 to carry out the processing steps shown in FIGS. 7 and 8 to determine a position of the vehicle 10 within the transport network.

In particular, as illustrated in FIG. 5, the computer readable instructions provide a data server 31, a track-constraint manager 32, and a navigation filter 34 which may also be referred to as a Bayesian estimation filter. In the particular example of FIG. 5, the navigation filter 34 is implemented as an unscented Kalman filter. The navigation filter 34 includes a state predictor 35 and a state updater 40.

Data Server 31

The data server 31 is responsible for collecting and distributing the sensor data received from the sensors 25, 27 to the navigation filter 34. Two data streams are output by the data server 31, i.e., (i) the inertial measurements collected from the IMU 26 and used as a control input to drive the state predictor 35, and; (ii) all non-IMU sensor measurements used to drive the state updater 40.

Track-Constraint Manager 32

The track-constraint manager 32 manages the interface between the navigation filter 34 and the map database 24 and provides an up-to-date track constraint function $x^E(s)$ to a constrained strapdown inertial navigation system (INS) 47 (shown in FIG. 6) of the state predictor 35.

The track constraint function $x^E(s)$ comprises three-dimensional curves that provide an approximation of the centrelines of the tracks within a part of the transport network which is in the vicinity of the vehicle 10. The track constraint function $x^E(s)$ may also be referred to as "track geometry data" since it indicates the geometry of the tracks of the transport network. Given that the vehicle 10 is expected to follow the tracks, the track constraint function $x^E(s)$ thus represents the constraint applied by the tracks of the transport network to the kinematic state of the vehicle. The parameter s is the arc-length of the centreline of the track from a chosen reference point. The superscript $^E$ is used to indicate that the track constraint function is defined with respect to the E-frame, which is a rotating frame of reference, fixed in the body of the Earth, and represented by a right-handed Cartesian set of axes with origin located at the centre of the Earth (i.e., the ECEF coordinate system).

The track constraint function $x^E(s)$ is constructed on-the-fly by the track constraint manager 32 from a set of support points (i.e., instances of the Vertices entity 23) stored in the map database 24. The track constraint manager 32 uses a latest estimated state $\tilde{x}$ output by the state predictor 35 (which includes the estimated position of the vehicle 10 as described below) to query the database 24, and identifies all support points in a local neighbourhood around the estimated position of the vehicle 10 and all possible trajectories that the vehicle 10 could then follow. The identified support points characterise the local track geometry and topology so that track constraints can be constructed for all possible routes passing through the estimated position of the vehicle 10. The track constraint manager 32 may construct multiple track constraint functions if there are multiple routes within the neighbourhood of the estimated position of the vehicle 10.

In an example as shown in FIG. 1, when the track constraint manager 32 determines that the vehicle 10 is between the vertices 3 and 4, the track constraint manager 32 identifies all support points within a range of three vertices at either side of the current estimate of the position of the vehicle 10 from the map database 24. The identified support points are vertices 1 to 8 shown in FIG. 1. In practice, the track constraint manager 32 may identify, for example, twenty support points on either side of the vehicle 10 in the vicinity of the current estimate of the position of the vehicle 10. It has been found that twenty support points will generally provide sufficient information to understand the track geometry in the neighbourhood of the vehicle 10. The support points are identified dynamically according to the current estimate of the position of the vehicle 10.

The possible trajectories that the vehicle 10 could follow can be easily determined based upon the Edge Vertices 22 and the Edge Connections 20 associated with the identified support points. For example, when the track constraint manager 32 determines that the vehicle 10 is between the vertices 3 and 4 and travelling towards the vertex 4, the track constraint manager 32 can determine that there are two possible paths (i.e., via edge 14 or edge 16) for the vehicle 10 to take after it passes the vertex 4. Each trajectory is defined by a subset of the identified support points, accounting for any implicit constraints in the transport network. The movement direction of the vehicle 10 may be directly measured by the sensors 25, 27, or alternatively may be indicated in the latest estimated state $\tilde{x}$ output by the state predictor 35.

The track constraint manager 32 constructs the track constraint function $x^E(s)$ as a polynomial function using the identified support points and the possible trajectories. The track constraint function $x^E(s)$ is constructed by interpolating the identified support points. In an example, the track constraint function $x^E(s)$ has continuous second-order derivatives through each of the identified support points.

The use of polynomial function with continuous second-order derivatives to interpolate the identified support points is advantageous in that it allows the centrelines of the tracks to be modelled more accurately than would be possible with a conventional piecewise linear interpolation using the same number of support points. Railway tracks, for example, (and most of the motorways) are constructed to enable safe and comfortable motion with low lateral jerk. Therefore, the variation in track curvature is smooth. As a consequence, a twice differentiable curve with a continuous second-order derivative is a suitable mathematical model for the track. Indeed, unlike the more conventional piecewise linear interpolation schemes, such a model provides a powerful constraint on the to-be-estimated kinematic state (e.g., position, direction of motion and the rate-of-change of direction of motion) of the vehicle without discontinuities.

In a particular example, the track constraint function $x^E(s)$ is a cubic spline, and the parameter s is the arc-length along the spline from a chosen reference point. A cubic spline is a spline interpolation constructed of piecewise third-order polynomials which pass through a set of control points (e.g., the identified support points). By construction, the cubic spline implicitly provides a twice differentiable curve with a continuous second-order derivative. Furthermore, the cubic spline yields the smallest norm of strain energy amongst all of the twice differentiable functions with a continuous second-order derivative that interpolate a set of supporting points and satisfy the same end-point conditions. The result obtained by the cubic spline interpolation is a curve progression with minimal oscillations between the supporting points.

The track constraint manager 32 may calculate the coefficients of a cubic spline parameterised by arc length, based upon the positions of the identified support points, the boundary conditions (either natural or fixed) of the cubic spline and the continuity requirements of first-order and second-order derivatives. To facilitate the calculation of the cubic spline by the track constraint manager 32, the support points stored in the map database 24 may be processed, for example, by a server (not shown), during the construction of the map database 24 based upon survey data in accordance with the processing steps shown in FIG. 7 and described below. In an example, the survey data includes discrete points sampled along the tracks of the transport network and includes information indicating the positions of the discrete points. The server which performs the steps of FIG. 7 may be remote from the vehicle 10 and be responsible for constructing the map database 24 based upon the survey data.

Figure 7:
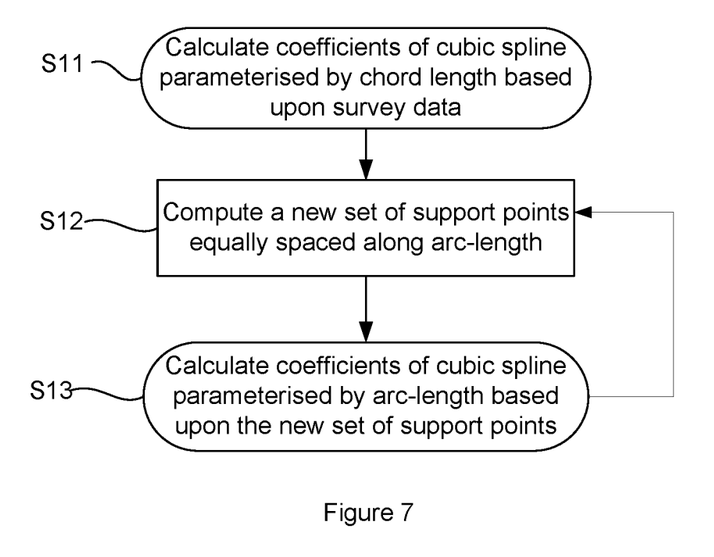
FIG. 7 is a flowchart of example processing steps that may be carried out by a server in order to facilitate the calculation of a cubic spline parameterised by arc-length.

At step S11, the server calculates the coefficients of a conventional cubic spline parameterised by chord length based upon the survey data. In particular, the calculation is based upon the positions of at least some of the discrete points included within the survey data, the boundary conditions (either natural or fixed) of the cubic spline and the continuity requirements of first-order and second-order derivatives. At step S12, the server computes a new set of support points which are equally spaced along the arc-length of the cubic spline calculated at step S11. At step S13, the server calculates the coefficients of a cubic spline parameterised by arc-length, using the new set of support points calculated at step S12, the boundary conditions and the continuity requirements of first-order and second-order derivatives. The server may iterate through steps S12 and S13 in order to yield better results (e.g., to ensure that the new set of support points calculated at step S12 are substantially equally spaced along the re-parameterised cubic spline calculated at step S13). The new set of support points calculated at step S12 may be stored in the map database 24 as support points.

In general, the track constraint function $x^E(s)$ represents an a priori knowledge of the track geometry of the transport network, and is useful for improving the navigation accuracy of the navigation filter 34. In particular, the track constraint function $x^E(s)$ improves the observability of errors in both the vehicle's navigation solution and the errors in the sensor measurements (e.g., the biases in the inertial measurements of the IMU 26) output by the sensors 25, 27 which are used to calculate the navigation solution. Further, when used in the navigation filter 34 as described below, the track constraint function $x^E(s)$ reduces the problem of estimating an unconstrained three-dimensional motion of the vehicle 10 to the problem of estimating a one-dimensional constrained motion of the vehicle 10 along the track of the transport network, because the vehicle 10 has only one degree of freedom along the track.

By constructing the track constraint function $x^E(s)$ on-the-fly from a small subset of support points in the vicinity of the current estimate of the position of the vehicle 10, the track constraint function $x^E(s)$ focuses upon the local constraints imposed on the vehicle by a small part of the transport network (instead of the entire transport network) in the neighbourhood of the vehicle, and the track constraint function $x^E(s)$ can be computed with great flexibility and efficiency. The local constraints provide sufficient information for estimating the kinematic state of the vehicle 10. Indeed, it has been realised that the geometry of the tracks far away from the vehicle 10 is less useful (if at all) for determining the kinematic state of the vehicle 10.

Overview of the Navigation Filter 34

The navigation filter 34 utilises a Bayesian filter algorithm and recursively performs prediction and update steps 30, 33 for estimating the state $\tilde{x}$ of the vehicle 10. The estimated state $\tilde{x}$ includes the kinematic state of the vehicle 10 (e.g., the position, velocity and/or attitude of the vehicle 10). The estimated state $\tilde{x}$ further includes states (e.g., the biases in the inertial measurements of the IMU 26) which are required to represent the kinematic state of the vehicle 10 and which may be determined in order to minimise the accumulation of errors in the estimation process.

In the prediction step 30, the state predictor 35 of the navigation filter 34 calculates the mean of the estimated state $\tilde{x}$ (also called an a priori estimate) at step 38 and its associated error covariance $\tilde{P}$ at step 39, based upon the track constraint function $x^E(s)$, the IMU measurement data $\Omega_{IB}^B$ and $s^B$, and the estimate state $\hat{x}$ and its associated error covariance $\hat{P}$ generated during the previous update step 33 by the state updater 40 (or the estimated state $\tilde{x}$ and its associated error covariance $\tilde{P}$ generated during the previous prediction step 30 if there is no available non-IMU measurement as described below).

The IMU measurement data may be referred to as "first sensor data". The non-IMU measurement data may be referred to as "second sensor data".

The prediction step 30 is data driven by the inertial measurements collected from the IMU 26. The prediction step 30 is used to propagate the estimated state forward in time between updates of the non-IMU sensor measurement.

When a prediction step 30 completes, the data server 31 is queried at step 41 to determine if there is any pending non-IMU sensor measurement. If there is no available non-IMU measurement, then the prediction step 30 is repeated with each incoming IMU measurement data until a time when non-IMU measurement data becomes available. Further, when a prediction step 30 completes, the newly estimated state $\tilde{x}$ and its associated error covariance $\tilde{P}$ are passed to the track constraint manager 32 in order to provide up-to-date track constraint function $x^E(s)$.

When a non-IMU sensor measurement y is available from the data server 31, the update step 33 is triggered. In the update step 33, the state updater 40 of the navigation filter 34 calculates the mean of the estimated state $\hat{x}$ (also called an a posteriori estimate) and its associated error covariance $\hat{P}$ at step 45, based upon the a priori estimate $\tilde{x}$ and its associated error covariance $\tilde{P}$ and the non-IMU sensor measurement y. The estimated state $\hat{x}$ and its associated error covariance $\hat{P}$ are subsequently supplied to the prediction step 30 of the next epoch.

After the completion of a prediction or an update step, the mean of the estimated state $\tilde{x}$ or $\hat{x}$ is available for the controller 9 to generate an output indicative of a position of the vehicle 10 within the transport network.

In this way, the navigation filter 34 is able to provide a relatively accurate estimate of the state of the vehicle 10 by fusing the IMU sensor measurement and the non-IMU sensor measurement with the track constraint function $x^E(s)$.

Due to the nature of the Bayesian estimation filter (which filters noise instead of data), the noise contained in the estimated state of the vehicle 10 is of a lesser extent than either the process noise contained in the state process model (e.g., constrained strapdown INS 47) or the measurement noises contained in the IMU sensor measurement and the non-IMU sensor measurement.

In the particular example provided by FIG. 5, the navigation filter 34 is implemented as an unscented Kalman filter. The unscented Kalman filter is suitable for handling non-linearities which may be associated with the process model and/or the measurement model and does not require the evaluation of explicit, or numerically approximated, Jacobians for the process models (which are however required by the extended Kalman filter).

In the unscented Kalman filter, an unscented transform is used to estimate the mean and error covariance of the state as it evolves in time according to a non-linear process model. The fundamental assumption is that the distribution of the estimated state can be approximated well by a Gaussian distribution at all times, in particular, after the state $\hat{x}$ is propagated through the state process model (represented by the constrained strapdown INS 47 in the example of FIG. 5), and after the state $\tilde{x}$ is adjusted to incorporate the non-IMU sensor measurement y output by the data server 31.

The unscented transform is performed utilising a carefully constructed set of sample points (referred to as "sigma points") from the mean of the estimated state (e.g., $\tilde{x}$, $\hat{x}$) and its associated error covariance (e.g., $\tilde{P}$, $\hat{P}$). The number of the sigma points is 2N+1, with N being the dimension of the state. The 2N+1 sigma points includes one point equal to the mean of the estimated state, and 2N points arranged symmetrically about the mean. The calculation of the sigma points for an unscented Kalman filter is described in references [1]-[2] and is well known in the field of art. The sigma points are transformed through the relevant system models and the resulting transformed points are used to recover estimates of the mean and the error covariance of the transformed state.

The prediction step 30 and the update step 33 of the navigation filter 34 are described in more detail below with reference to the state predictor 35 and the state updater 40.

State Predictor 35

The state predictor 35 generates at step 36 a set of sigma points which are denoted by $\{\chi_i\}_{i=1}^{2N+1}$, based upon the current mean of the estimated state $\hat{x}$ and its associated error covariance $\hat{P}$ generated during the update step 33 of the previous epoch.

The state predictor 35 further includes a constrained strapdown INS 47 (shown in FIG. 6) which serves as a state process model and performs step 37 to propagate the estimated state forward in time. The IMU measurement data $\omega_{IB}^B$ and $s^B$ are used as a control input to the constrained strapdown INS 47 during step 37. The constrained strapdown INS 47 integrates the IMU measurement data $\omega_{IB}^B$ and $s^B$ to determine the position, velocity and attitude of the IMU 26 relative to an Earth-Centred Earth-Fixed (ECEF) Cartesian coordinate frame-of-reference. Because the IMU 26 is strapped down to the vehicle 10, the position, velocity and attitude of the IMU 26 are equivalent to or closely related to the position, velocity and attitude of the vehicle 10, which are a part of the estimated state (e.g., $\tilde{x}$, $\hat{x}$) of the navigation filter 34.

The measurement data $s^B$ refers to the specific force resolved in a B-frame, which is a rotating frame-of-reference that is fixed with respect to the vehicle 10 that carries the IMU 26. The B-frame is represented by a right-handed Cartesian set of co-ordinate axes with origin located at the centre-of-mass of the IMU 26 which is itself strapped down rigidly to the vehicle 10. The B-frame includes an $x_1$ axis which is parallel to the centreline of the vehicle 10, and is therefore fixed relative to the vehicle 10. The measurement data $\omega_{IB}^B$ refers to the angular rate of the B-frame relative to an I-frame resolved in the B-frame. The I-frame is a Newtonian inertial frame of reference that is represented by a right-handed Cartesian set of axes with origin located at the centre of the Earth and coincident with the E-frame at some chosen reference epoch (e.g., $t=t_0$).

The term "constrained" in the name of the INS 47 means that, unlike conventional strapdown inertial navigation algorithms, the integration carried out by the INS 47 which determines the position of the IMU 26 based upon velocity data is modified through incorporation of the track constraint function $x^E(s)$ so that the final position produced is constrained to be on the curve of the track constraint function $x^E(s)$. This ensures that the state predictor 35 can never produce a position solution that lies off the track.

An example of the constrained strapdown INS 47 is illustrated in FIG. 6. The INS 47 outputs data 52, 62 and 63. Data 52, $R_B^I$, is the attitude (i.e., orientation) of the B-frame relative to the I-frame, which is equal to the attitude of the vehicle 10 relative to the I-frame. Data 62, $v_e^E$, is the velocity of the IMU 26 relative to the E-frame. Data 63, $r_e^E$, is the position of the IMU 26 relative to the E-frame.

The constrained strapdown INS 47 has a T-frame integrator 50, which integrates the IMU measurement data $\omega_{IB}^B$ and $s^B$ to calculate data 52 and a thrust inertial velocity $v_t^I$ of the IMU 26. The T-frame integrator 50 has an initial condition 51, which includes, for example, an initial value of a thrust inertial velocity of the IMU 26 and an initial value of an attitude rotation matrix resolving the I-frame coordinates into coordinates of a thrust velocity frame (i.e., the T-frame). The T-frame is an orthogonal right-handed coordinate frame-of-reference with axes parallel to those of the B-frame. The translation of the origin of the T-frame relative to the I-frame, i.e. the centre of the Earth, is defined to be the thrust velocity $v_t^I$.

The constrained strapdown INS 47 further comprises a G-frame integrator 53 which calculates a gravitational inertial velocity $v_g^I$ of the IMU 26, by integrating data 64, $\omega_{IE}^E$, which is the Earth's angular rate and $g^E$ which is the Earth's gravitation. $\omega_{IE}^E$ is a known parameter for the INS 47. $g^E$ is determined at block 65 using standard Earth models based upon the value of the data 63 previously calculated by an R-frame integrator 56.

The G-frame integrator 53 has an initial condition 54 which includes, for example, an initial value of the gravitational inertial velocity $v_g^I$ and an initial value of an attitude rotation matrix resolving coordinates of a gravitational velocity frame (i.e., the G-frame) into the I-frame coordinates. The G-frame is an orthogonal right-handed co-ordinate frame of reference with axes parallel to those of the E-frame. The translation of the origin of the G-frame relative to the I-frame is defined to be exactly the gravitational velocity $v_g^I$.

The T-frame integrator 50 and G-frame integrator 53 are not affected by the track constraint function $x^E(s)$, and may be implemented using well-known algorithms.

The thrust inertial velocity $v_t^I$ and the gravitational inertial velocity $v_g^I$ of the IMU 26 are then combined at an adder 55 to generate $v_i^I$ which is the true inertial velocity of the IMU 26. The true velocity of the IMU 26 $v_i^I$, data 52 and data 64 are then supplied to an R-frame integrator 56 for calculating data 62 and data 63.

The R-frame integrator 56 integrates the speed of the R-frame along the track, i.e., the first-order derivative $\dot{S}$ of the arc-length s along the tracks from a chosen reference point, and subsequently uses the integration of S with the track constraint function $x^E(s)$ to derive the velocity and the position of the IMU 26. The arc-length s is a function of time t.

$\dot{S}$ can be calculated according to Equation (1) as follows:

$$\dot{s}(t) = \hat{e}_{R1}^E(t) \cdot v_{ER}^E(t) = \hat{e}_{R1}^E(t) \cdot (v_e^E(t) - R_B^E(t)\omega_{EB}^B(t) \times r_{RB}^B) \quad (1)$$

In Equation (1), $$\hat{e}_{R1}^E(t) \equiv R_R^E(t) \begin{pmatrix} 1 \\ 0 \\ 0 \end{pmatrix} \quad (2)$$

$R_R^E(t)$ is an attitude rotation matrix resolving the coordinates of an R-frame into E-frame coordinates. The R-frame, is attached to a fixed point-of-reference on a bogie of the vehicle 10 and therefore moves along the associated shifted version of the track centreline. The R-frame has an $x_1$ axis which is parallel to the centreline of the track and points forward. The track constraint function $x^E(s)$ therefore gives the E-frame position co-ordinates of the R-frame and the tangent vector of the track constraint function $x^E(s)$ gives the R-frame's $x_1$ axis direction resolved in E-frame coordinates.

$R_B^E(t)$ is an attitude rotation matrix resolving B-frame coordinates into E-frame coordinates. $R_R^E(t)$ and $R_B^E(t)$ can be calculated using the integration products of the T-frame integrator 50 and the G-frame integrator 53.

In Equation (1), $v_e^E(t)$ is the latest value of data 62 calculated in the previous cycle by the R-frame integrator 56. Further, $r_{RB}^B$ represents the position of the B-frame relative to the R-frame resolved in the B-frame. $r_{RB}^B$ is modelled as a fixed lever-arm vector. In practice, the lever-arm vector may not be constant due to small rotations of the B-frame relative to the R-frame when, for example, the vehicle 10 travels around a bend and the IMU 26 is not mounted directly above the R-frame. Further, $\omega_{EB}^B(t)$ of Equation (1) can be calculated as follows:

$$\omega_{EB}^B(t) = \omega_{IB}^B(t) - R_E^B(t)\omega_{IE}^E(t) \quad (3)$$

$\omega_{IB}^B(t)$ is the IMU measurement data output by the IMU 26. $\omega_{IE}^E(t)$ is data 64.

Subsequently, the R-frame integrator 56 integrates $\dot{S}$ over time under an initial condition 57 to update the value of the arc-length s. The initial condition 57 includes an initial value of the arc-length s and/or the chosen reference point.

The track constraint function $x^E(s)$, represented by block 58, is supplied to the R-frame integrator 56. The E-frame position co-ordinates of the R-frame, i.e., $r_{ER}^E$, is equivalent to the value of the track constraint function $x^E(s)$ at the integrated value of S. That is, $$r_{ER}^E = x^E(\int \dot{s}dt) \quad (4)$$

$r_{ER}^E$ can be further used to update the value of data 62 and data 63 according to Equations (5) and (6):

$$r_e^E(t) = r_{ER}^E(t) + R_B^E(t)r_{RB}^B \quad (5)$$

$$v_e^E(t) = R_I^E(t)v_i^I(t) - \omega_{IE}^E(t) = r_e^E(t) \quad (6)$$

$R_I^E(t)$ is an attitude rotation matrix resolving the I-frame coordinates into the E-frame coordinates, and is determined by the G-frame integrator 53 since the axes of the G-frame are parallel to those of the E-frame.

Thus, the R-frame integrator 56 integrates the along-track speed of the IMU 26 to obtain distance travelled by the IMU 26 along the curve of the track constraint function $x^E(s)$ relative to a chosen reference point. The constrained strapdown INS 47 therefore encapsulates the time evolution function for the primary navigation sub-states of interest, namely: (i) the B-frame attitude relative to I-frame, i.e., data 52; (ii) the B-frame velocity relative to the I-frame, i.e., $v_i^I$ and (iii) the distance along-track of the R-frame, i.e., s(t).

Since the integration carried out by the R-frame integrator 56 incorporates the track constraint function $x^E(s)$, the position (i.e., data 63) of the IMU 26 determined by the INS 47 is constrained to be on the curve of the track constraint function $x^E(s)$. The position (i.e., data 63) of the IMU 26 is a part of the estimated state (e.g., $\tilde{x}$, $\hat{x}$) of the navigation filter 34.

The T-frame integrator 50 and the G-frame integrator 53 are executed in parallel. Each of the T-frame integrator 50 and the G-frame integrator 53 provides one updated data sample (including, $R_B^I$ (which is equal to $R_T^I$) and $v_t^I$ provided by the T-frame integrator 50, and $R_E^I$ (which is equal to $R_G^I$) and $v_g^I$ provided by the G-frame integrator 53) after receiving a number of incoming IMU data samples. This is referred to as a minor-loop update. The R-frame integrator 56 receives a number of data samples from the T-frame integrator 50 and the G-frame integrator 53 in order to complete an update cycle, which is referred to as major-loop update. Therefore, the R-frame integrator 56 is updated at a slower rate than the T-frame integrator 50 and the G-frame integrator 53.

As shown in FIG. 5, each of the sigma-points $\{\chi_i\}_{i=1}^{2N+1}$ generated at step 36 is passed through the constrained strapdown INS 47, which generates sigma points $\{\chi_i^+\}_{i=1}^{2N+1}$. The values of the sigma-points $\{\chi_i\}_{i=1}^{2N+1}$ provide at least a part of the initial conditions 51, 54 and 57.

The resulting sigma points $\{\chi_i^+\}_{i=1}^{2N+1}$ are subsequently used to calculate the mean of a new estimated state and its covariance, at steps 38, 39. This is based upon an assumption that the estimated state can be approximately by a Gaussian distribution.

The mean of a new estimated state and its covariance, $\tilde{x}$, $\tilde{P}$ (also referred to as an a priori estimate) are provided to the track constraint manager 32 to query the map database 24, such that the track constraint manager 32 dynamically provides an up-to-date track constraint function $x^E(s)$ in the vicinity of the estimated position of the vehicle 10 to the constrained strapdown INS 47.

If it is determined at step 41, after querying the data server 31, that there are no available non-IMU measurements, the new filter state mean and covariance, $\tilde{x}$, $\tilde{P}$ are processed at step 36 to generate a new set of sigma points $\{\chi_i\}_{i=1}^{2N+1}$ to initiate the state of the constrained strapdown INS 47.

State Updater 40

The state updater 40 is triggered to start an update step 33 based upon the a priori estimate $\tilde{x}$ and its error covariance $\tilde{P}$, if non-IMU sensor measurement data is available from the data server 31.

The non-IMU sensor measurement data may be of different measurement types. For example, the non-IMU sensor measurement data may be provided by a wheel-, visual- or radar-odometer or a radar, which is a part of the second sensor 27 providing reference positional information. Further or alternatively, the non-IMU sensor measurement data may be provided by a balise reader or a GNSS sensor, which is a part of the first sensor 25 providing absolute positional information.

For each measurement type, the state updater 40 comprises a measurement model that characterises both the quality of the measurement and the functional relationship between the measurement and the state in the absence of measurement errors.

Thus, the state updater 40 creates at step 44 an appropriate measurement model for each measurement y from a particular non-IMU sensor. The created measurement model comprises: (i) R, the error covariance characterising the measurement noise process, assumed that the measurement noise has zero-mean and satisfies Gaussian distribution; and (ii) a function h(x) which maps the state space into the measurement space. By using the function h(x) and a state $\tilde{x}$, a predicted measurement $\tilde{y}$ can be calculated as $\tilde{y}=h(\tilde{x})$. The function h(x) may also be referred to as an observation model.

The measurement model may be created suitably, based upon the measurement type and the elements of the state.

Having created the function h(x), the unscented transform is again used within the update step 33 to compute the Kalman gain that is used to incorporate new information into the estimated state.

In particular, the state updater 40 constructs at step 42 a set of 2N+1 sigma points from the a priori estimate $\tilde{x}$ and its error covariance $\tilde{P}$. The set of sigma points are denoted as $\{\chi_i\}_{i=1}^{2N+1}$.

The state updater 40 subsequently propagates each of the sigma points $\{\chi_i\}_{i=1}^{2N+1}$ through the function h(x) to obtain a set of predicted measurement sigma points $\{\mathcal{Y}_i\}_{i=1}^{2N+1}$ at step 43. The measurement sigma points are calculated according to Equation (7):

$$\mathcal{Y}_i = h(\chi_i), i=1,2\ldots 2N+1 \quad (7)$$

The state updater 40 further calculates the Kalman gain, and the a posteriori estimate (i.e., the updated state estimate) at step 45, based upon the sigma points $\{\chi_i\}_{i=1}^{2N+1}$, $\{\mathcal{Y}_i\}_{i=1}^{2N+1}$, the non-IMU measurement data y, and the measurement noise R.

In particular, the state updater 40 calculates at step 45 an error covariance $\widetilde{P_y}$ of the predicted measurements using $\{\mathcal{Y}_i\}_{i=1}^{2N+1}$ and the measurement noise R. The state updater 40 further calculates at step 45 a cross covariance $\widetilde{P_{xy}}$ of the estimated state and the predicted measurement using $\{\chi_i\}_{i=1}^{2N+1}$ and $\{\mathcal{Y}_i\}_{i=1}^{2N+1}$.

The state updater 40 then calculates at step 45 the Kalman gain K based upon the error covariance $\widetilde{P_y}$ and the cross covariance $\widetilde{P_{xy}}$ according to Equation (8):

$$K = \widetilde{P_{xy}} \widetilde{P_y}^{-1} \quad (8)$$

The difference between the measurement y and the mean (denoted by $\tilde{y}$) of the sigma points $\{\mathcal{Y}_i\}_{i=1}^{2N+1}$ is called "innovation". The innovation encapsulates the new information introduced into the update step 33. The innovation is used in conjunction with the Kalman gain and the a priori estimate $\tilde{x}$ and its error covariance $\tilde{P}$ to compute the a posteriori estimate $\hat{x}$ and its error covariance $\hat{P}$. In particular, the a posteriori estimate $\hat{x}$ and its error covariance $\hat{P}$ are calculated according to Equations (9) and (10).

$$\hat{x} = \tilde{x} + K(y - \tilde{y}) \quad (9)$$

$$\hat{P} = \tilde{P} - K \widetilde{P_y} K^T \quad (10)$$

The track constraint function $x^E(s)$ may be further exploited during the update step. How this is done is dependent upon the application and whether the constraint can be treated as absolute or approximate. For example, if the vehicle 10 is a train and vibration of the vehicle 10 is ignored, the orientation of the train travelling along a railway track can be determined from the track constraint function $x^E(s)$ which represents the centreline of the track and the position of the train. It would be appreciated that only pitch and yaw of the train can be determined from the track constraint function $x^E(s)$, but not roll. Roll, however, can be constrained to a certain degree if the cant of the train tracks is also incorporated into the map database 24. It would be understood that the cant of the tracks may only provide a part of the total roll of the train because the train tends to roll on its suspension when travelling around bends. Hence, a very accurate pseudo-measurement of the attitude (in particular, the pitch and yaw components of the attitude) of the train can be derived based upon the track constraint function $x^E(s)$ and the estimated position of the train indicated in the a priori estimated state $\tilde{x}$. The roll component of the attitude may also be estimated by imposing a dynamical constraint—e.g., a train stays on the track and therefore the only acceleration acting is centripetal acceleration.

The pseudo-measurement of the attitude of the train is essentially the direction of the $x_1$ axis of the B-frame from the track constraint function $x^E(s)$ given the arc-length parameter s. The pseudo-measurement may be constructed from the tangent and curvature values of the track constraint function $x^E(s)$ at an estimated position (which is a part of the estimated state $\tilde{x}$) of the train.

The term "pseudo" means that the measurement is not a real measurement obtained from any of the sensors 25, 27, but is used as a measurement together with the non-IMU sensor measurement in the update step. In particular, the pseudo-measurement of the attitude of the train may be supplied to the state updater 40 as a measurement y. The state updater 40 computes the measurement model h(x) for the pseudo-measurement at step 44, and the pseudo-measurement is used to compute the Kalman gain K and the a posteriori estimate $\hat{x}$ and its error covariance $\hat{P}$.

It would be appreciated that if the vehicle 10 is a car and the transport network is a road network, a similar pseudo-measurement of the attitude of the car can also be applied to the state updater 40, but with less accuracy because cars have greater freedom and higher maneuverability within the road network.

For implementation purpose, an update of the pseudo-measurement of the attitude may be applied intermittently. For example, an update of the pseudo-measurement of the attitude may be applied together with every visual odometer measurement update.

The utilisation of the track constraint function $x^E(s)$ within both of the prediction and the update steps 30, 33 of the navigation filer 34 as described above constitutes optimal use of the track constraint information. By imposing the track constraint function $x^E(s)$ in the constrained strapdown INS 47, the evolution of the estimate of the position of the vehicle 10 is always consistent with one-dimensional motion along the track centreline represented by the track constraint function $x^E(s)$, and the state prediction (e.g., $\tilde{x}$) and the propagation of the state estimate errors (e.g., $\tilde{P}$) generated by the state predictor 35 are kept consistent with the track constraint function $x^E(s)$. By further imposing the track constraint function $x^E(s)$ as a pseudo-measurement in the update step, the state updater 40 only adjusts the estimate of the position of the vehicle 10 along the track centreline represented by the track constraint function $x^E(s)$. The track constraint function $x^E(s)$ improves both the mean of the estimated state (e.g., $\tilde{x}$, $\hat{x}$) and the associated error covariance (e.g., $\tilde{P}$, $\hat{P}$).

In this way, the vehicle 10 can be accurately positioned along the track centreline represented by the track constraint function $x^E(s)$. The navigation filter 34 would not produce a position of the vehicle 10 which is off the track of the transport network.

Vehicle Positioning

Figure 8:
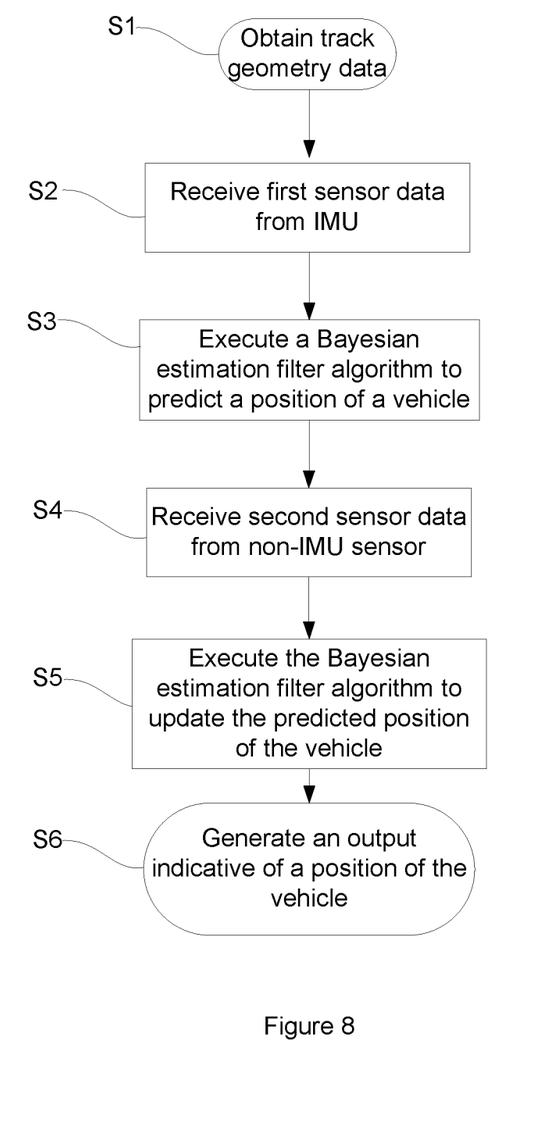
FIG. 8 is a flowchart of example processing steps that may be carried out by the controller of FIG. 4 for determining a position of the vehicle.

The controller 9 further carries out processing steps for determining a position of the vehicle 10. The processing steps are shown in FIG. 8 and described below.

At step S1, the controller 9 (in particular, the track-constraint manager 32 of FIG. 5) obtains the track constraint function $x^E(s)$ (i.e., track geometry data) which indicates track geometry of at least a part of the transport network in the vicinity of the vehicle 10. The track constraint function $x^E(s)$ is obtained on-the-fly dynamically based upon the current position of the vehicle 10. The current position of the vehicle 10 may be an initial position of the vehicle 10, with the initial position being determined by the first sensor 25 which provides information indicating an absolute position of the vehicle 10, Alternatively, the current position of the vehicle 10 may be the latest estimated position of the vehicle 10 indicated within the estimated state $\tilde{x}$ output by the state predictor 35.

At step S2, the state predictor 35 of the navigation filter 34 receives first sensor data from the IMU 26 which is strapped down to the vehicle 10.

At step S3, the navigation filter 34 is executed to perform a prediction step 30. That is, the state predictor 35 of the navigation filter 34 is executed to generate the mean of an estimated state $\tilde{x}$ of the vehicle 10 and the error covariance $\tilde{P}$ of the estimated state. The estimated state $\tilde{x}$ includes a predicted position of the vehicle 10 within the transport network.

In particular, as described above, the constrained strapdown INS 47 of the state predictor 35 comprises an R-frame integrator 56 which integrates a speed of the IMU 26 (i.e., the first-order derivative $\dot{S}$ of an arc-length of the track) along a track defined by the track constraint function $x^E(s)$ based at least upon the first sensor data and the track constraint function $x^E(s)$. This integration reduces the problem of estimating an unconstrained three-dimensional position of the vehicle 10 to the problem of estimating a one-dimensional position of the vehicle 10 along the track defined by the track constraint function $x^E(s)$, and ensures that the predicted position of the vehicle 10 lies on the track defined by the track constraint function $x^E(s)$. Further, the use of the track constraint function $x^E(s)$ in the constrained strapdown INS 47 models the propagation of kinematic state estimation errors into the one-dimensional position solution space and allows the instantaneous curvature and tangent information of the track as defined in the track geometry data to be taken into account. Consequently, the accuracy of the predicted position of the vehicle 10 is improved.

At step S4, the state updater 40 of the navigation filter 34 receives second sensor data from a non-IMU sensor (e.g., a sensor within the sensors 25, 27 other than the IMU 26) mounted to the vehicle 10.

At step S5, after receiving the second sensor data, the navigation filter 34 is executed to perform an update step 33. In particular, the state updater 40 is executed to update the estimated state $\tilde{x}$ and its error covariance $\tilde{P}$ based upon the second sensor data and to generate a mean of an a posteriori estimate $\hat{x}$ and its error covariance $\hat{P}$.

The track constraint function $x^E(s)$ may be exploited by the state updater 40 at step S5. In particular, a pseudo-measurement of the attitude of the vehicle 10 may be calculated by the state updater 40 based upon the curvature of the track as defined by the track constraint function $x^E(s)$ at the predicted position of the vehicle 10 included within the estimated state $\tilde{x}$. The pseudo-measurement may be processed by the state updater 40 in the same way as the second sensor data.

The a posteriori estimate 2 and its error covariance $\hat{P}$ may be subsequently provided to the state predictor 35, so that the navigation filter 34 recursively executes the prediction step 30 and the update step 33. That is, the controller 9 may recursively perform steps S1 to S5 to improve the accuracy of the estimated states (e.g., $\tilde{x}$, $\hat{x}$) and to reduce the associated error covariances (e.g., $\tilde{P}$, $\hat{P}$).

At step S6, the controller 9 generates an output indicative of a position of the vehicle 10 within the transport network based upon at least one of the predicted position of the vehicle included within the estimated state $\tilde{x}$ and the updated predicted position of the vehicle included within the estimated state $\hat{x}$.

Between steps S3 and S4, the controller 9 may perform an optional step of determining whether second sensor data (i.e., non-IMU measurement) is available.

If the second sensor data is available, the processing may proceed to steps S4 and S5 to trigger an update step 33 of the navigation filter 34.

If, however, the second sensor data is not available, steps S1 to S3 may be repeated based upon the mean of an estimated state $\tilde{x}$ and its error covariance $\tilde{P}$ generated at previous step S3 until the second sensor data becomes available. That is, the prediction step 30 is repeated with each incoming first sensor data until a time when second sensor data has been received.

In an example, the state space and the measurement space of the navigation filter 34 may be Euclidean vector space, in particular N-dimensional Euclidean vector-space. That is, the state (e.g., $\tilde{x}$, $\hat{x}$) and its error covariance (e.g., $\tilde{P}$, $\hat{P}$) as well as the measurement y are represented as Euclidean vectors.

In an alternative example, the state (e.g., $\tilde{x}$, $\hat{x}$) and its error covariance (e.g., $\tilde{P}$, $\hat{P}$) as well as the measurement y are represented as elements of Lie groups (in particular, matrix Lie groups). Consequently, the navigation filter 34 is implemented based upon Lie groups. The navigation filter 34 may therefore be referred to as a Lie group navigation filter. In particular, the constrained strapdown INS 47 may be implemented based upon a particular type of matrix Lie groups, namely Special Euclidean Lie groups SE(3). The working principle of the navigation filter 34 and the constrained strapdown INS 47 are not affected by the use of Lie groups. The details of Lie groups, Lie algebras, and the implementation of a sensor fusion algorithm (e.g., the navigation filter 34) using the machinery of Lie groups are known from references [3] to [6].

It is advantageous to represent the state and the measurement using matrix Lie groups, because matrix Lie groups can easily represent a complex state which comprises multiple sub-states using a product matrix Lie group. The product matrix Lie group encapsulates the typological structure of the state space. In contrast, the topological structure of the state space may be lost in the process of translating a state model into an N-dimensional Euclidean vector-space.

The processing steps shown in FIGS. 7 and 8 and the navigation filter 34 may be implemented in C++ language or any other suitable programming language.

In the example provided by FIG. 5, the navigation filter 34 is implemented as an unscented Kalman filter. It would be appreciated that the navigation filter 34 may be implemented using a different type of the Bayesian estimation filter, such as, extended Kalman filter, etc.

Although the above description has set out preferred embodiments, it should be understood that these embodiments are illustrative only and that the claims are not limited to those embodiments. Those skilled in the art will be able to make modifications and alternatives in view of the invention which are contemplated as falling within the scope of the appended claims. Each feature disclosed or illustrated in the present specification may be incorporated in the embodiments, whether alone or in any appropriate combination with any other feature disclosed or illustrated herein.

REFERENCES

[1] Van der Merwe R., Wan E., Julier S., *Sigma-point Kalman filters for non-linear estimation and sensor fusion: application to integrated navigation*, proceedings of American Institute of Aeronautics and Astronautics (AIAA) Guidance, Navigation and Control conference and exhibition, August $16^{th}$-$19^{th}$, Providence, Rhode Island, 2004.

[2] Van der Merwe R., Wan, *Sigma-point Kalman filters for probabilistic inference in dynamic state-space models*, proceedings of the Workshop on Advances in Machine Learning, June $8^{th}$-$11^{th}$, Montreal, Canada, 2003.

[3] Hall B. C., *Lie groups, Lie algebras and representations: An elementary introduction*, Graduate Texts in Mathematics 222 ($2^{nd}$ ed.), Springer, ISBN 0-387-40122-9, 2015.

[4] Iwasawa K., *On the representation of Lie algebras*, Japanese Journal of Mathematics, Nos. 19, 1948, pp. 405-426.

[5] Hertzberg C., Wagner R., Frese U. and Schröder L., *Integrating Gweneric Sensor Fusion Algorithms with Sound State Representations through Encapsulation of Manifolds*, Information Fusion, Vol. 14, Issue 1., January 2013, pp. 57-77.

[6] Fletcher P. T., Lu, C., and Joshi, S., *Statistics of Shape via Principal Component Analysis on Lie Groups*, Proceedings of IEEE Conference on Computer Vision and Pattern Recognition, 2003, pp. 95-101.

The invention claimed is:

1. A computer-implemented method of determining a position of a vehicle within a transport network, comprising:
   obtaining track geometry data indicating track geometry of at least a part of the transport network, wherein the track geometry data is parameterized by an arc-length of the track, wherein obtaining the track geometry data comprises:
      accessing a map database, wherein the map database comprises a plurality of sample points positioned along tracks within the transport network;
      retrieving from the map database sample points of the plurality of sample points, the sample points being in the vicinity of a predicted position of the vehicle; and
      applying an interpolation function through the sample points retrieved to obtain a track constraint function, the track geometry data comprising the track constraint function, the track constraint function comprising a twice differentiable curve with a continuous second-order derivative;
   receiving first sensor data from an inertial measurement unit mounted to the vehicle;
   executing a Bayesian estimation filter algorithm to obtain an updated prediction of the position of the vehicle, wherein the Bayesian estimation filter algorithm comprises a process model, the process model comprising a strapdown inertial navigation algorithm, and wherein the strapdown inertial navigation algorithm generates data indicative of the updated prediction of the position of the vehicle based at least upon the first sensor data and the track geometry data such that the updated prediction of the position of the vehicle lies on a track defined by the track geometry data;
   receiving second sensor data from a sensor other than the inertial measurement unit, wherein the sensor is mounted to the vehicle;
   executing the Bayesian estimation filter algorithm to obtain a further updated prediction of the position of the vehicle based at least upon the second sensor data; and
   generating an output indicative of a position of the vehicle within the transport network based upon at least one of the updated prediction of the position of the vehicle and the further updated prediction of the position of the vehicle.

2. A computer-implemented method according to claim 1, further comprising:
   executing the strapdown inertial navigation algorithm to calculate a speed of the inertial measurement unit along the track defined by the track geometry data based at least upon the first sensor data, to integrate the speed over time and to generate data indicative of the updated prediction of the position of the vehicle based at least upon the track geometry data and the integration of the speed.

3. A computer-implemented method according to claim 1, further comprising dynamically obtaining the track geometry data indicating track geometry of at least a part of the transport network which is in the vicinity of the predicted position of the vehicle.

4. A computer-implemented method according to claim 1, wherein the interpolation function comprises a cubic spline function.

5. A computer-implemented method according to claim 1, wherein the track constraint function is parameterized by an arc-length of the track.

6. A computer-implemented method according to claim 1, wherein the sensor other than an inertial measurement unit is selected from a group consisting of at least one of a GNSS sensor, a balise reader, a radar, a speed sensor, an odometer, a video camera and a lidar detector.

7. A computer-implemented method according to claim 1, further comprising:
   executing the strapdown inertial navigation algorithm to calculate a first-order derivative of an arc-length of the track travelled by a reference frame, based upon the first sensor data, an earth's angular rate and an earth's gravitation; wherein the reference frame is arranged to be attached to a fixed point-of-reference on the vehicle and arranged to be constrained to move along the track defined by the track geometry data.

8. A computer-implemented method according to claim 7, further comprising:
   executing the strapdown inertial navigation algorithm to integrate the first-order derivative over time so as to obtain the arc-length travelled by the reference frame.

9. A computer-implemented method according to claim 8, further comprising:

executing the strapdown inertial navigation algorithm to generate data indicative of the updated prediction of the position of vehicle based at least upon the track geometry data and the arc-length travelled by the reference frame.

10. A computer-implemented method according to claim 1, wherein the first sensor data comprises a specific force and an angular rate measured by the inertial measurement unit.

11. A computer-implemented method according to claim 1, further comprising:
   determining whether the second sensor data is available, and
   in response to determining that the second sensor data is not available:
      obtaining new track geometry data indicating track geometry of at least a part of the transport network based upon the updated prediction of the position of the vehicle; and
      executing the Bayesian estimation filter algorithm to predict a new position of the vehicle based at least upon the new track geometry data and the first sensor data received from the inertial measurement unit.

12. A computer-implemented method according to claim 1, further comprising:
   executing the Bayesian estimation filter algorithm to obtain the further updated prediction of the position of the vehicle based at least upon the second sensor data and the track geometry data.

13. A computer-implemented method according to claim 12, further comprising:
   calculating a pseudo-measurement of the attitude of the vehicle based upon the track geometry data and the predicted position of the vehicle; and
   executing the Bayesian estimation filter algorithm to obtain the updated prediction of the position of the vehicle based upon the pseudo-measurement of the attitude of the vehicle.

14. A computer-implemented method according to claim 13, wherein the pseudo-measurement of the attitude of the vehicle is calculated based upon a tangent of the track geometry data at the predicted position of the vehicle.

15. A computer-implemented method according to claim 1, wherein the Bayesian estimation filter algorithm comprises an unscented Kalman filter.

16. A computer-implemented method according to claim 1, wherein the Bayesian estimation filter algorithm comprises a Lie-group unscented Kalman filter.

17. A computer-implemented method according to claim 1, wherein the strapdown inertial navigation algorithm comprises a Lie group strapdown inertial navigation algorithm.

18. A computer-implemented method according to claim 1, wherein the vehicle comprises one of a train and a tram.

19. A computer program comprising computer readable instructions configured to cause a computer to carry out a method according to claim 1.

20. A computer readable medium carrying a computer program according to claim 19.

21. An apparatus for positioning a vehicle within a transport network, comprising:
   a memory storing processor readable instructions; and
   a processor arranged to read and execute the processor readable instructions stored in the memory, wherein the processor readable instructions comprise instructions arranged to control the processor to carry out a method according to claim 1.

22. An apparatus according to claim 21, wherein the apparatus further comprises a map database comprising sample points positioned along tracks within at least a part of the transport network.

* * * * *